(12) United States Patent
Monza et al.

(10) Patent No.: US 8,819,631 B2
(45) Date of Patent: Aug. 26, 2014

(54) SYSTEM AND METHOD FOR SELF DEPENDENT WEB AUTOMATION

(75) Inventors: Sagi Monza, Rishon-Lezion (IL); Moshe Eran Kraus, Mazkeret Batya (IL); Svetlana Aronov, Rehovot (IL); Dror Schwartz, Holon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 641 days.

(21) Appl. No.: 13/006,204

(22) Filed: Jan. 13, 2011

(65) Prior Publication Data

US 2012/0185823 A1    Jul. 19, 2012

(51) Int. Cl.
G06F 9/44    (2006.01)

(52) U.S. Cl.
USPC .................. 717/124; 717/115; 717/127

(58) Field of Classification Search
None
See application file for complete search history.

(56) References Cited

U.S. PATENT DOCUMENTS

| | | | |
|---|---|---|---|
| 6,184,880 B1 * | 2/2001 | Okada ........................... | 715/704 |
| 6,292,936 B1 * | 9/2001 | Wang ........................... | 717/115 |
| 7,143,400 B2 * | 11/2006 | Lee et al. ....................... | 717/141 |
| 7,165,241 B2 * | 1/2007 | Manda et al. .................. | 717/124 |
| 7,234,132 B2 * | 6/2007 | Lam ................................ | 717/120 |
| 7,251,780 B2 * | 7/2007 | Cheng ........................... | 715/234 |
| 7,418,697 B2 * | 8/2008 | Gryko et al. ................... | 717/124 |
| 7,437,715 B2 * | 10/2008 | Chatsinchai et al. ......... | 717/127 |
| 7,593,980 B2 * | 9/2009 | Marascio et al. ............. | 709/201 |
| 7,661,090 B2 * | 2/2010 | Schmidt et al. ............... | 717/127 |
| 7,823,145 B1 * | 10/2010 | Le et al. ......................... | 717/168 |
| 7,921,333 B2 * | 4/2011 | Smith et al. ..................... | 714/39 |
| 7,958,497 B1 * | 6/2011 | Lindo et al. .................... | 717/128 |
| 8,196,108 B2 * | 6/2012 | Bennet et al. .................. | 717/127 |
| 8,234,660 B2 * | 7/2012 | Ari et al. ........................ | 719/320 |
| 8,245,194 B2 * | 8/2012 | Atkin et al. .................... | 717/124 |
| 8,359,581 B2 * | 1/2013 | Ortiz .............................. | 717/128 |
| 8,365,147 B2 * | 1/2013 | Grechanik et al. ............ | 717/124 |
| 8,407,461 B2 * | 3/2013 | Cheong et al. ................ | 713/100 |
| 2005/0223356 A1 * | 10/2005 | Kanchi ......................... | 717/115 |
| 2008/0244062 A1 * | 10/2008 | Elangovan et al. ........... | 709/224 |
| 2009/0049427 A1 * | 2/2009 | Zhao ............................. | 717/127 |
| 2009/0187918 A1 * | 7/2009 | Chen et al. .................... | 717/115 |
| 2010/0005447 A1 * | 1/2010 | McCoy ......................... | 717/115 |
| 2010/0162212 A1 * | 6/2010 | Stall et al. ..................... | 717/124 |
| 2011/0307868 A1 * | 12/2011 | Schwartz et al. ............. | 717/127 |
| 2012/0159453 A1 * | 6/2012 | Zhao ............................. | 717/127 |
| 2012/0324426 A1 * | 12/2012 | Smith et al. ................... | 717/124 |
| 2013/0132930 A1 * | 5/2013 | Hamilton et al. ............. | 717/115 |

(Continued)

OTHER PUBLICATIONS

Hargassner, et al., "A Script-Based Testbed for Mobile Software Frameworks"; 2008 IEEE; [retrived on Mar. 21, 2014]; Retrieved from Internet <URL:http://ieeexplore.ieee.org/stamp/stamp.jsp?tp=&arnumber=454539573>;pp. 448-457.*

(Continued)

*Primary Examiner* — Xi D Chen

(57) ABSTRACT

A method for web automation includes providing a self dependent automation script. The self dependent automation script includes a script model that includes instructions to be executed by a processor, and an incorporated runtime engine configured to execute the script model on the processor. The method further includes applying a runtime engine selected from a set of at least one runtime engine, the set including at least the incorporated runtime engine, so as to execute the script model. A computer program product and data processing system are also disclosed.

17 Claims, 3 Drawing Sheets

(56) References Cited

U.S. PATENT DOCUMENTS

2013/0191812 A1* 7/2013 Mishra et al. ............... 717/124
2013/0247003 A1* 9/2013 Seth et al. .................. 717/115
2013/0263090 A1* 10/2013 Polk et al. .................. 717/124

OTHER PUBLICATIONS

Fu, et al., "An AI Modeling Tool for Designers and Developers"; 2007 IEEE;[retrived on Mar. 21, 2014]; Retrieved from Internet <URL:http://ieeexplore.ieee.org/stamp/stamp.jsp?tp=&arnumber=4161599>;pp. 1-9.*

Engelen, "A Framework for Service-Oriented Computing with C and C++ Web Service Components"; 2008 ACM; [retrived on Mar. 21, 2014]; Retrieved from Internet <URL:http://dl.acm.org/citation.cfm?id=1361186>;pp. 12:1-12:25.*

Bringmann, Kramer, "Systematic Testing of the Continuous Behavior of Automotive Systems"; 2005 ACM; [retrived on Mar. 21, 2014]; Retrieved from Internet <URL:http://dl.acm.org/citation.cfm?id=1138474>;pp. 13-19.*

\* cited by examiner

SYSTEM AND METHOD FOR SELF DEPENDENT WEB AUTOMATION

BACKGROUND

An automated application may run in accordance with a script. A script may include a list of instructions that are to be automatically performed by a processor or system. Web automation may be understood to include such automated script-based applications that are designed to run within the framework of an application, such as a browser, operating on the World Wide Web, the Internet, or another network.

An example of web automation includes automatic performance testing. Automatic performance testing may enable simulating and evaluating behavior of a software-based system under conditions that may be difficult to achieve otherwise. Such conditions may include testing a system under a heavy user load. For example, a heavy user load may include a large number of users that are accessing a system concurrently. An automatic performance testing program or application may be applied to emulate the behavior of such a large number of users. The automatic performance testing emulation may send a series of commands to the system that simulate interactions of a large number of users. During the emulation, information regarding components of the system may be collected and analyzed. Analysis of the information may be used in identifying potential or actual problems with the system, and what corrective action may be taken. For example, automatic performance testing may be used to evaluate performance of a system such as an automated teller machine (ATM) server or a database server.

Web automation may be based on recorded scripts. For example, at a user level, a script may include a sequence of user actions such as clicking, pressing a button, dragging, opening/closing a dialog box, typing, and selecting. Such a sequence of user actions may be recorded from a user actually performing these actions on a user interface, or may be written or edited using an appropriate script writing/editing user interface. At a transport level, the script may be converted to a series of electronic signals for transmission to a destination (e.g. to a server of the system to be tested) in accordance with a protocol.

Recording of the script may include conversion of the script into instructions that are interpretable by a runtime engine. The runtime engine may be configurable so as to replay one or more recorded scripts to perform the associated actions. For example, instructions of the script may be transmitted over a network to a component of a system being tested. By replaying multiple instances of recorded scripts, a runtime engine may simulate multiple users ("virtual users") that interact with the system.

BRIEF DESCRIPTION OF THE DRAWINGS

Reference is made to the accompanying drawings, in which.

DETAILED DESCRIPTION

Figure 1:
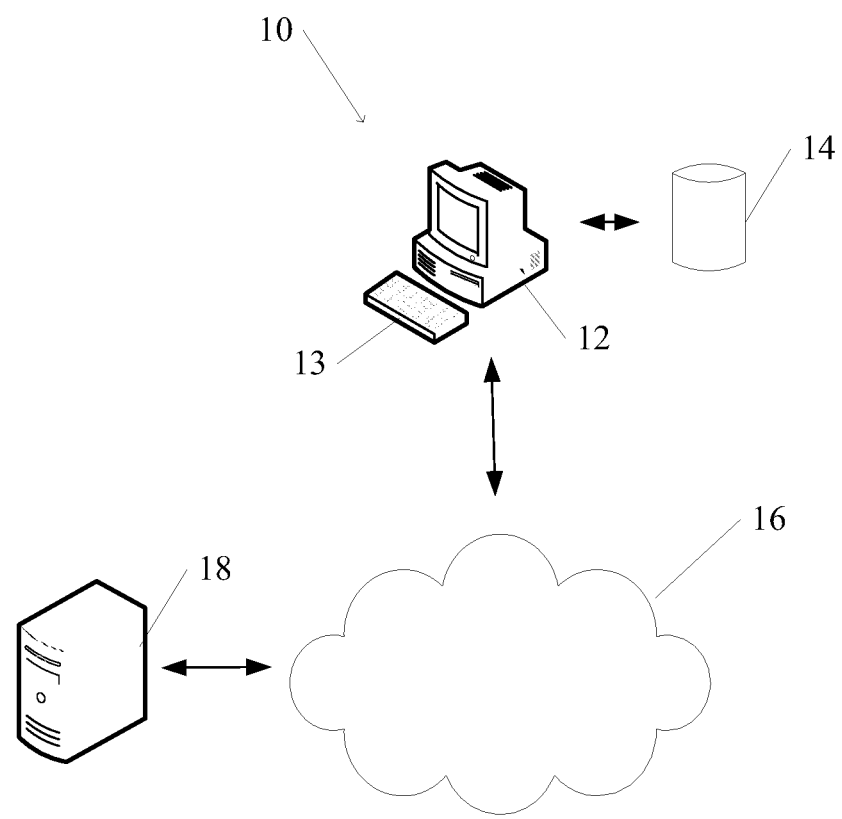
FIG. 1 schematically illustrates a system for operating with self dependent automation scripts, in accordance with an embodiment of the invention.

Web automation, in accordance with an embodiment of the present invention, may include providing and executing a self dependent automation script. The self dependent automation script may include a data structure or folder, enabling incorporation of a script model and a script engine. The self dependent automation script may include the script itself in the form of a script model or code. The script model may include instructions for automatically performing a sequence of actions. The actions may simulate actions of a user performing a series of actions using a user interface.

In addition to the script model, the self dependent automation script may include, or host, one or more runtime engines. A runtime engine may include a program or set of instructions that may be applied to recording and running a script model. For example, the runtime engine may be incorporated into the self dependent automation script in the form of a Java Archive (JAR) file.

The self dependent automation script may be loaded for running by a computer or other processor. For example, the self dependent automation script may be run by an application or program. One or more runtime engines may be incorporated into the application. For example, when installing or upgrading, the program or application, a set of runtime engines may also be installed. However, the installed runtime engine may be different than a runtime engine that is included in a self dependent automation script. Under some circumstances, it may be advantageous for an automatic performance testing application to apply a runtime engine that is included in a self dependent automation script rather than an installed runtime. A runtime engine may be selected from a set of available runtime engines on the basis of a relevancy criterion.

An example of such an application or program is an automatic performance testing application. A script model of the self dependent automation script may include instructions for performing a sequence of simulated actions for testing, or evaluating the performance of, a system or other application. Instructions of the script model may be executed by the automatic performance testing application. An operator of the automatic performance testing application (or a script selection module or program of the automatic performance testing application) may select a self dependent automation script to be loaded by the automatic performance testing application. The automatic performance testing application may apply a runtime engine, such as a runtime engine extracted from the self dependent automation script, so as to execute the instructions of the script model.

For example, a self dependent automation script may have been recorded using a runtime engine installed together with a different (e.g. earlier) version of an application than a version of the application that is currently installed. In this case, it may be preferable to avoid running the script model under the current runtime engine. (Running a script model under a different runtime engine than the runtime engine under which the script model was recorded may result in undesirable or unforeseen results. For example, the script may not run, or may yield wrong or misleading results.)

Thus, in order to ensure that the script model runs as expected independently of a currently installed version of the application and runtime engine, one or more runtime engines may be included in the self dependent automation script. For example, the included runtime engines may include runtime engines under which the script model was recorded. Prior to running the script model, a runtime engine may be extracted from the self dependent automation script. Thus, a runtime engine under which the self dependent automation script had been recorded may be available for running the script model. Thus, the self dependent automation script may run by an appropriate application at later date or on another machine, independent of any currently installed runtime engines.

As another example, a self dependent automation script may be designated for use under a particular runtime environment. The particular runtime environment may impose runtime constraints on running the script. A runtime engine may be adapted to the particular runtime environment (rather than designing a general-purpose runtime engine that is adapted to this and other runtime environments). The particular runtime environment may not be compatible with an installed runtime engine.

In this case, the self dependent automation script may include a runtime engine that was designed specifically for constraints or other characteristics of that particular environment. For example, such environmental factors may include resource management (e.g. favoring optimization of use of a central processing unit versus favoring optimization for memory use), emulation of or working with a specific network browser, and/or working under a specific platform or operating system. The environment-specific runtime engine may be included in a self dependent automation script. An environment-specific runtime engine may be available when running a associated self dependent automation script under the particular environment.

As another example, a self dependent automation script may be run concurrently on several machines. For example, a script model for system testing may be run concurrently on several machines so as to increase the number of simulated users of the system over the number that may be possible when run on a single machine. In one implementation, all of the concurrently running machines may be configured with the same runtime engine.

The desired runtime engine for concurrent running on several machines may be included in the self dependent automation script. By extracting that runtime engine from the self dependent automation script, the desired runtime engine may be made available to all of the concurrently running machines. Each of the concurrently running machines may run a script using a single runtime engine, independent of any runtime engines that are installed on each of the concurrently running machines.

Alternatively, a machine may have no appropriate application or runtime engine installed. In order to run on such a machine, a self dependent automation script may be a standalone script that does not require an installed application in order to run.

Prior to running a self dependent automation script, a runtime engine may be selected for running the associated script model under an appropriate application. The selected runtime engine may be an installed runtime engine associated with the application, or it may be a runtime engine extracted from the self dependent automation script. For example, an operator of the application may select a runtime engine to be used. Alternatively, the application may be configured to automatically select a runtime engine on the basis of predetermined criteria.

FIG. 1 schematically illustrates a system for operating with self dependent automation scripts, in accordance with an embodiment of the invention. Although the system is described as related to a particular exemplary system, namely, a system configured for automatic performance testing, the description may equally apply to any type of system configured for a script-based web automation application. Another example of a script-based web automation system may include, for example, a system configured for generating emails or other network-based messages, a tutorial or demonstration application that mimics user actions, or a service application for performing actions that would be performed by service personnel.

A script-based web automation system for running a self dependent automation script, such as automatic performance testing system 10, may include a processor 12. Processor 12 may be configured to run an automatic performance testing application with self dependent automation scripts. Processor 12 may include a computer or other processing device capable of executing programmed instructions on the basis of stored instructions and data. Processor 12 may include two or more intercommunicating or independent processors. For example, a set of independent processors of processor 12 may each be configured to run an automatic performance testing application independently of the others (e.g. to simulate a large number of users interacting with a system being tested).

Processor 12 may include an input/output device 13. For example, input/output device 13 may include an input device such as a keyboard, keypad, touch screen, microphone, or pointing device. The input device may be operated by a user in order to, for example, enter instructions or to record a script. Input/output device 13 may include an output device such as a display screen or loudspeaker. The output device may, for example, convey instructions or a status for a user, or may present a user with available options.

Processor 12 may access data on a data storage device 14. Data storage device 14 may include a single data storage device, or two or more data storage devices that are each accessible by processor 12. Data storage device 14 may include a storage device that is incorporated into processor 12, or may include a removable storage device. Processor 12 may read data from, or write data to, data storage device 14. For example, data storage device 14 may be configured to store programmed instructions for operation of an automatic performance testing application. Data storage device 14 may also be configured to store one or more self dependent automation scripts.

Automatic performance testing system 10 may communicate with another system, such as server system 18, via a network 16. Network 16 may include any communications connection that enables communication between systems or computers. For example, network 16 may include a hard-wired connection, or a dedicated wireless connection. Network 16 may include any wired or wireless network connection, such as, for example, an intranet, the Internet, or a telephone or other communications network.

Server system 18 may be understood to represent any system (whether or not actually defined as a server) that is to be communicated with, or whose performance is to be tested or evaluated by, an automatic performance testing application running on automatic performance testing system 10. Server system 18 may represent any system configured to be communicated with by a user or by another system, such as a client computer. For example, server system 18 may be configured to concurrently communicate with a large number of client users or systems.

Thus by communicating with server system 18 via network 16, automatic performance testing system 10 may send instructions to server system 18 in accordance with a self dependent automation script. By sending such instructions while collecting and analyzing information from components of server system 18, a performance of server system 18 may be evaluated.

Figure 2:
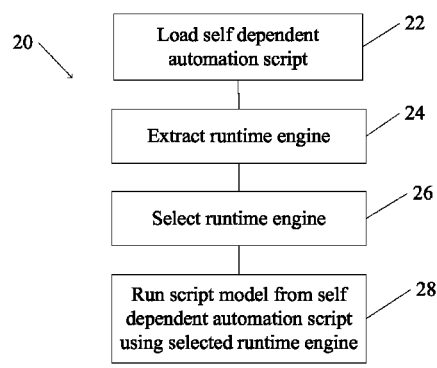
FIG. 2 is a flowchart of a method for web automation with a self dependent automation script, in accordance with an embodiment of the present invention.

FIG. 2 is a flowchart of a method for web automation with a self dependent automation script, in accordance with an embodiment of the present invention. Although web automation method 20 is described in connection with a particular exemplary application, namely, automatic performance testing, web automation method 20 as illustrated may apply to any web automation application.

Web automation method 20 may be executed as a function of an appropriate application, such as an automatic performance testing application. For example, the appropriate application may be incorporated into a processor. Alternatively, web automation method 20 may be executed from a self dependent automation script that is in the form of a standalone script.

Web automation method 20 may be executed, for example, in order to test the performance of a system.

When Web automation method 20 is to be executed, an appropriate self dependent automation script may be loaded (step 22). For example, the self dependent automation script may be loaded into an automatic performance testing application. Alternatively, a self dependent automation script in the form of a standalone script may be opened by a computer or processor.

For example, the self dependent automation script may include a script model containing instructions for simulating an interaction with the system to be tested. The self dependent automation script may be loaded from a memory device. For example, an operator of the automatic performance testing application may select a self dependent automation script for loading. Alternatively, the automatic performance testing application may be configured to automatically select a self dependent automation script for loading (e.g. on the basis of a system to be tested, or on the basis of other predetermined criteria). The self dependent automation script may have been previously recorded and stored by an operator of the automatic performance testing application.

One or more runtime engines may be extracted from the self dependent automation script (step 24). The loaded self dependent automation script may include, e.g. as part of a data structure or folder, a script model and a runtime engine. In addition, one or more other runtime engines may be available. For example, one or more runtime engines may be installed on a system on which web automation method 20 is being executed.

A runtime engine with which to run the script model of the loaded self dependent automation script may be selected (step 26). For example, an automatic performance testing application may select a runtime engine with which to run the script model of the loaded self dependent automation script. The selected runtime engine may be a runtime engine that was extracted from the self dependent automation script, or may be an installed runtime engine that is associated with the automatic performance testing application. The selection may be made by an operator of the automatic performance testing application or of a processor on which the self dependent automation script is to be run.

For example, a user interface of an application may present an operator with a list of available runtime engines. The operator may then interact with the user interface so as to select a runtime engine. Alternatively, the application may select a runtime engine in accordance with predetermined criteria or rules.

A runtime engine may be selected, either by an operator or automatically by an application, on the basis of various considerations. Such considerations may include, for example, a current runtime environment or a runtime engine version under which the self dependent automation script was originally recorded. For example, a runtime engine that was extracted from a self dependent automation script may be selected in order to ensure compatibility with a particular script model, in order to ensure compatibility with a particular environment, or in order to achieve uniform results when running on different machines.

A script model of the self dependent automation script may be run using the selected runtime engine (step 28). For example, an automatic performance testing application may send instructions to a system being tested, such as a server system, in accordance with the script model. Running the script model may then simulate one or more users that are interacting with the system being tested.

Figure 3:
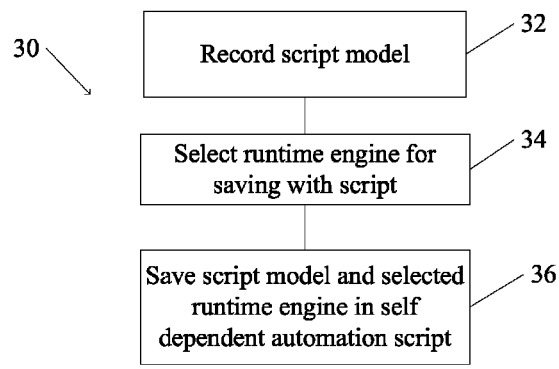
FIG. 3 is a flowchart of a method for creating a self dependent automation script, in accordance with an embodiment of the present invention.

FIG. 3 is a flowchart of a method for creating a self dependent automation script, in accordance with an embodiment of the present invention. Self dependent automation script creation method 30 includes recording a script model (step 32). For example, an operator may operate an application, such as an automatic performance testing application, in a record mode. The operator or application may select a runtime engine, e.g. from among installed runtime engines. The operator may then perform a series of operations (e.g. by interacting with a user interface) to record a series of user actions. The application may record the actions using the selected runtime engine. When the script model has been recorded, the operator may indicate that recording is finished. The application may then save the recorded script model.

One or more runtime engines may be selected for saving with the recorded script model (step 34). For example, the runtime engines may be selected, either by the operator or automatically by the application, based on a relevancy criterion. For example, relevancy criteria may include a runtime engine version, resource management considerations, or platform specific behavior considerations.

The script model and the selected runtime engines may then be saved together as a self dependent automation script (step 36). For example, the incorporation of the script model and selected runtime engines in the self dependent automation script may be implemented using JavaScript.

A self dependent automation script, in accordance with an embodiment of the invention, may facilitate efficient support for an application such as an automatic performance testing application. For example, support may be required in connection with a self dependent automation script. (For example, running the self dependent automation script may not yield expected results.) In this case, the self dependent automation script may be sent to a support provider or to a developer of the application. Since a relevant runtime engine may be included in the self dependent automation script, analysis of a function of the self dependent automation script may be facilitated. In addition, a modified self dependent automation script may be returned by the support provide with an included runtime engine. For example, the included runtime engine may have been modified so as to accommodate a particular user's need or environment. Thus, a modified runtime engine may be provided to a user without requiring modification of an entire application.

A capability of creating self dependent automation scripts may simplify revising and upgrading of an application such as an automatic performance testing application. Since each self dependent automation script may include a runtime engine under which the associated script model was recorded, an updated version of the application need not include that runtime engine. For example, a new version of the automatic performance testing application may be designed with new or improved versions of runtime engines. Older, and possibly obsolete, versions of runtime engines need not be included in a newer version of the automatic performance testing application.

A self dependent automation script, in accordance with an embodiment of the invention, may be in the form of a standalone script. A self dependent automation script in the form of a standalone script may be capable of running independently of any installed applications. Thus, a standalone script may be run on a computer or system on which no associated application has been installed. For example, a standalone script may include any software or programs required for running at least a minimal version of the script.

For example, a self dependent automation script in the form of a standalone script may be recorded using an application such as an automatic performance testing application. The standalone script may be run at a later date on a system on which no appropriate application has been installed. For example, a standalone script may be run on a remote computer from a portable medium or after being sent to the remote computer over a network.

Use of a self dependent automation script in the form of a standalone script may enable onetime or occasional use of the associated script model. For example, a system testing service provider may be able to perform onetime or occasional testing of a system. In addition, a developer of a web automation application may run a standalone script in order to demonstrate a product or capability prior to installing or upgrading the application.

A self dependent automation script method, in accordance with an embodiment of the invention, may be implemented in the form of software, hardware or a combination thereof.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to embodiments of the invention.

What is claimed is:

1. A computer implemented method for web automation, the method comprising:
    providing a self dependent automation script, the self dependent automation script comprising:
        a script model that includes instructions to perform a sequence of actions to be executed by a processor, and
        an incorporated runtime engine configured to execute the script model on the processor; and
    applying a runtime engine selected from a set of at least one runtime engine, said set of at least one runtime engine including at least the incorporated runtime engine, so as to execute the script model,
    in which the incorporated runtime engine is a runtime engine under which the script model had been recorded.

2. The method of claim 1, wherein said set of at least one runtime engine comprises an installed runtime engine.

3. The method of claim 1, wherein the instructions comprise instructions for evaluating the performance of a system.

4. The method of claim 3, wherein applying a runtime engine comprises running an automatic performance testing application.

5. The method of claim 1, wherein the self dependent automation script is a standalone script.

6. A non-transitory computer readable medium containing instructions that when executed cause a processor to execute the steps of:
    providing a self dependent automation script, the self dependent automation script comprising:
        a script model that includes instructions to perform a sequence of actions to be executed by a processor, and
        an incorporated runtime engine configured to execute the script model on the processor; and
    applying a runtime engine selected from a set of at least one runtime engine, said set of at least one runtime engine including at least the incorporated runtime engine, so as to execute the script model,
    in which the incorporated runtime engine is a runtime engine under which the script model had been recorded.

7. The non-transitory computer readable medium of claim 6, wherein said set of at least one runtime engine comprises an installed runtime engine.

8. The non-transitory computer readable medium of claim 6, wherein the instructions comprise instructions for evaluating the performance of a system.

9. The non-transitory computer readable medium of claim 8, wherein applying a runtime engine comprises running an automatic performance testing application.

10. The non-transitory computer readable medium of claim 6, wherein the self dependent automation script is a standalone script.

11. The non-transitory computer readable medium of claim 6, containing instructions for using a selected runtime engine to record a script and saving the recorded script together with the selected runtime engine as the self dependent automation script.

12. A data processing system comprising:
    a processing unit in communication with a computer usable medium, the processing unit configured to execute instructions contained within the computer usable medium, and the set of instructions configured to:
        provide a self dependent automation script, the self dependent automation script comprising:
            a script model that includes instructions to perform a sequence of actions to be executed by a processor, and
            an incorporated runtime engine configured to execute the script model on the processor; and
        apply a runtime engine selected from a set of at least one runtime engine, said set of at least one runtime engine including at least the incorporated runtime engine, so as to execute the script model, in which the incorporated runtime engine is a runtime engine under which the script model had been recorded.

13. The system of claim 12, wherein said set of at least one runtime engine comprises an installed runtime engine.

14. The system of claim 12, wherein the instructions comprise instructions for evaluating the performance of a system.

15. The system of claim 14, wherein the processing unit is designed to carry out the set of instructions to apply the runtime engine as part of carrying out instructions of an automatic performance testing application.

16. The system of claim 12, wherein the self dependent automation script is a standalone script.

17. The system of claim 12, wherein the processing unit is designed to carry out the set of instructions to use a selected runtime engine to record a script and save the recorded script together with the selected runtime engine as the self dependent automation script.

* * * * *